Feb. 17, 1953          S. W. ALDERFER        2,628,654
PROCESS AND APPARATUS FOR THE MANUFACTURE
OF SPONGE RUBBER PRODUCTS Filed April 15, 1950                          7 Sheets-Sheet 1

*INVENTOR.*
STERLING W. ALDERFER
BY
*ATTORNEYS*

Feb. 17, 1953   S. W. ALDERFER   2,628,654
PROCESS AND APPARATUS FOR THE MANUFACTURE
OF SPONGE RUBBER PRODUCTS
Filed April 15, 1950   7 Sheets-Sheet 4

FIG. 5

INVENTOR.
BY STERLING W. ALDERFER
ATTORNEYS

Feb. 17, 1953    S. W. ALDERFER    2,628,654
PROCESS AND APPARATUS FOR THE MANUFACTURE
OF SPONGE RUBBER PRODUCTS
Filed April 15, 1950    7 Sheets-Sheet 6

FIG. 8

INVENTOR.
STERLING W. ALDERFER
BY
ATTORNEYS

Feb. 17, 1953   S. W. ALDERFER   2,628,654
PROCESS AND APPARATUS FOR THE MANUFACTURE
OF SPONGE RUBBER PRODUCTS
Filed April 15, 1950   7 Sheets-Sheet 7

FIG. 9

INVENTOR.
STERLING W. ALDERFER
BY
Ely & Frye
ATTORNEYS

Patented Feb. 17, 1953

2,628,654

UNITED STATES PATENT OFFICE 2,628,654

PROCESS AND APPARATUS FOR THE MANUFACTURE OF SPONGE RUBBER PRODUCTS

Sterling W. Alderfer, Akron, Ohio, assignor of three-tenths to Edward D. Andrews, Akron, Ohio Application April 15, 1950, Serial No. 156,203

36 Claims. (Cl. 154—1)

The present invention relates to the manufacture of sponge rubber products, particularly sheets of sponge rubber adhered to a fabric backing or facing layer. The manufacture of sponge rubber products having a fabric backing is known in the art but the existing methods have many disadvantages which the present invention is designed to overcome.

One of the methods previously employed is to attach a vulcanized sheet of sponge rubber to a fabric by means of an adhesive, but, due to the fact that the adhesive which is interposed between the sponge rubber layer and the fabric layer will close the pores and interstices in the fabric and in the sponge rubber, the finished material will not permit the passage of air and hence is unsuitable for many uses to which the product of this invention is adapted. In some cases, a sheet of sponge rubber has been split, somewhat in the manner that hides are split, and the layers adhered to a fabric backing. The surface of a split layer of sponge rubber is rough, due to the exposure of the cellular structure, and is unsuitable for many of the uses to which the product made by the procedure shown herein is adapted. The adhesive between the fabric and the sponge rubber layer is apt to break or loosen in service and the operation of adhesively joining the sponge rubber and fabric is expensive and troublesome.

Among the advantages of the present invention is the fact that the product is permeable to the passage of air, so that it will ventilate or breathe, and the product is therefore useful for the manufacture of insoles, seat covers, cushions, mattress covers, and the like, for which non-permeable material is wholly unfit.

The product of the present invention is also distinctive in that the surface of the sponge rubber has a substantially smooth, molded surface, so that it not only presents a better appearance but also is adapted to many uses for which the older types of products are unfit.

The machine and method shown herein produces fabric-backed sponge rubber sheeting faster and more economically than is possible by previous machines or methods. The product is uniform and the operation of the machine requires a minimum of attention on the part of the operator.

Attempts have been made to manufacture thin sheets of sponge rubber from foamed latex by casting or molding operations, but these attempts have not been successful due to the inability to obtain sheets of even thickness and due to the excessive cost of such operations. For these reasons the manufacture of thin sponge rubber sheets has been confined to making thick sheets of sponge rubber and then splitting the sheets.

The present invention relates to the method and apparatus shown herein and to such modifications, variations, and improvements thereon as fall within the scope of the invention as set forth in the claims. The improved product is the subject of a co-pending application, Serial No. 156,201, filed April 15, 1950.

The machine and method shown herein are improvements upon the machine and method shown and described in applicant's prior application, Serial No. 78,952, filed March 1, 1949, now abandoned. The present application is a continuation in part of such prior application as to all subject matter in common therewith.

One of the principal uses of the material is in the manufacture of seat coverings for automobiles, furniture, or the like. In such cases, nylon fabric or fabric woven from threads of other well known plastics is commonly employed. Other fabrics, such as muslin, duck, drilling, silk, burlap, or the like, may be employed, it being desirable that such fabrics have a woven or knitted structure although this may not be necessary if through porosity of the product is not required, in which case an impervious sheet may be employed. Carpet and rug linings, and paddings for all uses, are made cheaper and better than materials as heretofore made. Card table covers, cushions, mattress covers, mattresses, and the like may be made out of the material. The sponge rubber surface is soft and smooth and has a velvety feel, very much like the feel of a soft chamois. It may therefore be used for powder puffs or for parts of garments which come in contact with the body, or for shoe linings, hat bands, and the like. Many other uses will suggest themselves.

For the best results, the fabric layer should be of a woven or knitted construction because of the fact that the sponge rubber layer contains a multiplicity of minute cells or air pockets, uniformly distributed throughout the mass of sponge rubber and in communication with each other, with the outer surface of the sponge rubber layer, and with the interstices of the fabric backing. The smooth surface on the sponge rubber constituent is due to the fact that the foamed latex is spread upon and sets in contact with a smooth and, preferably, polished surface of a belt or other support. The setting of the foamed latex against such a surface imparts the smooth finish free of "pock marks" or cavities due to the bursting of air bubbles on the exposed surface of the sponge rubber, which is one of the special attributes of the product produced by the machine and process of this invention.

The material which is used for the sponge layer is preferably a foamed rubber latex to which are added the usual vulcanizing, aging, and foaming ingredients and such pigments and loading material as may be desirable. The requisites for compounding are well known in the art and vary within the province of any skilled rubber compounder. The machinery used for foaming the latex may be any of the well known types, it being essential merely that a substantial volume of air be introduced into the latex and that the latex and air be thoroughly beaten so that the multiplicity of minute air bubbles be uniformly distributed throughout the foam. The foam may also be made by incorporating any well known foaming agent in the latex. In the manufacture of sponge rubber products, it is the practice to add to the foam, as the foaming operation is completed, one or more gelling or setting agents so that the foam will set and will not collapse prior to vulcanization. These gelling agents are well known, the more commonly employed being sodium silico-fluoride.

While the use of a rubber latex foam is preferred, equivalent materials may be substituted therefor and wherever the terms "latex," "latex foam," or the like are used in this specification or claims, it will be understood that such equivalents are intended to be included. Where the term "textile fabric" is used, it will be understood to cover any suitable material of a structure which will have the interstices by which the product is permeable to the passage of air.

In the drawings and specification, the machine and method are shown in the best known and preferred forms.

Figure 1:
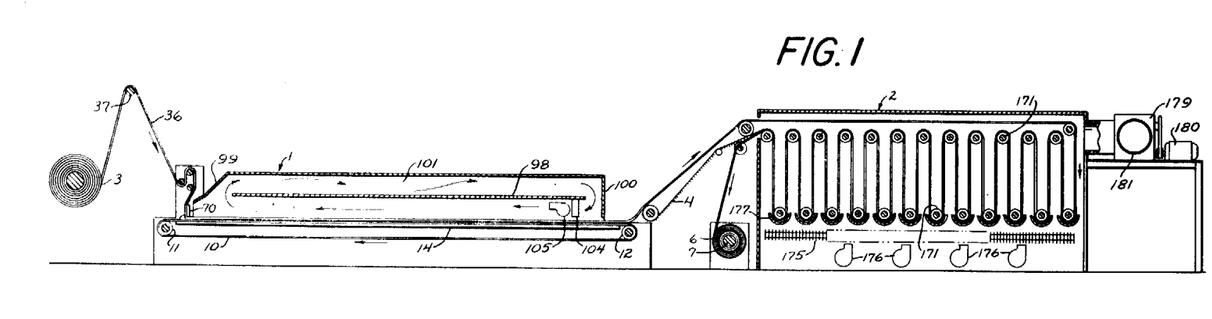
Fig. 1 shows in outline a complete production unit.

Referring to Fig. 1, the apparatus comprises a setting or gelling chamber or oven, indicated as a whole by the numeral 1, and a vulcanizing chamber indicated as a whole by the numeral 2. The fabric supply is indicated by the numeral 3 and the conveyor, shown here as a tentering unit of a well known type, is indicated at 4. The setting chamber is carried on long channels 5 which extend beneath the entire chamber. The tentering chains or belts extend from a point near the delivery end of the setting chamber 1 through the vulcanizing chamber 2, being festooned as shown, and deliver the finished product to the receiving point where it may be wound up in a roll 6 on a beam 7.

Through the setting chamber 1 and extending beyond both ends thereof, is a belt 10 which may be termed the setting belt. The belt may be made of rubber or of stainless steel. At the left hand or entrance to the chamber 1, the belt is supported on a pulley 11 mounted in adjustable bearings 9 and, at the right hand or delivery end, upon a pulley 12, the latter being the drive pulley which propels the belt in the direction of the arrow in Fig. 2. Throughout the extent of the chamber 1, the belt is supported on a base plate 14 carried by cross beams 15 and longitudinal beams 16, located in the chamber 1, so that the upper or working surface of the belt does not sag at any point.

Figure 2:
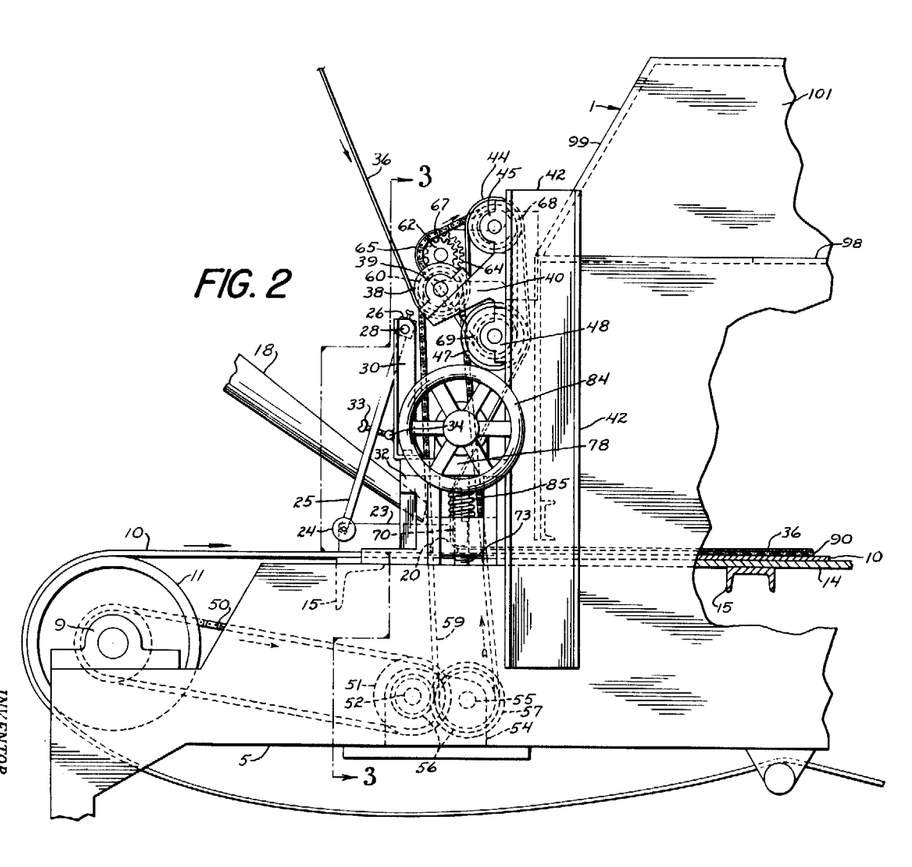
Fig. 2 is a side elevation of the left hand end of the apparatus as shown in Fig. 1, this view showing the point at which the foamed latex is spread upon the supporting surface and where the fabric meets the layer of foamed rubber.

The foamed latex is delivered to the exposed upper surface of the belt 10 at a point just ahead of the entrance to the chamber 1. It may be delivered by a chute 18 that receives the foamed and treated latex, containing the gelling agent, directly from any suitable foaming apparatus, not shown. The chute 18 may be moved back and forth manually or by any suitable oscillating mechanism (not shown), so that the foamed latex will pile up in a bank on the surface of the belt. A mass of this foamed latex is indicated by the numeral 20.

Figures 3, 4:
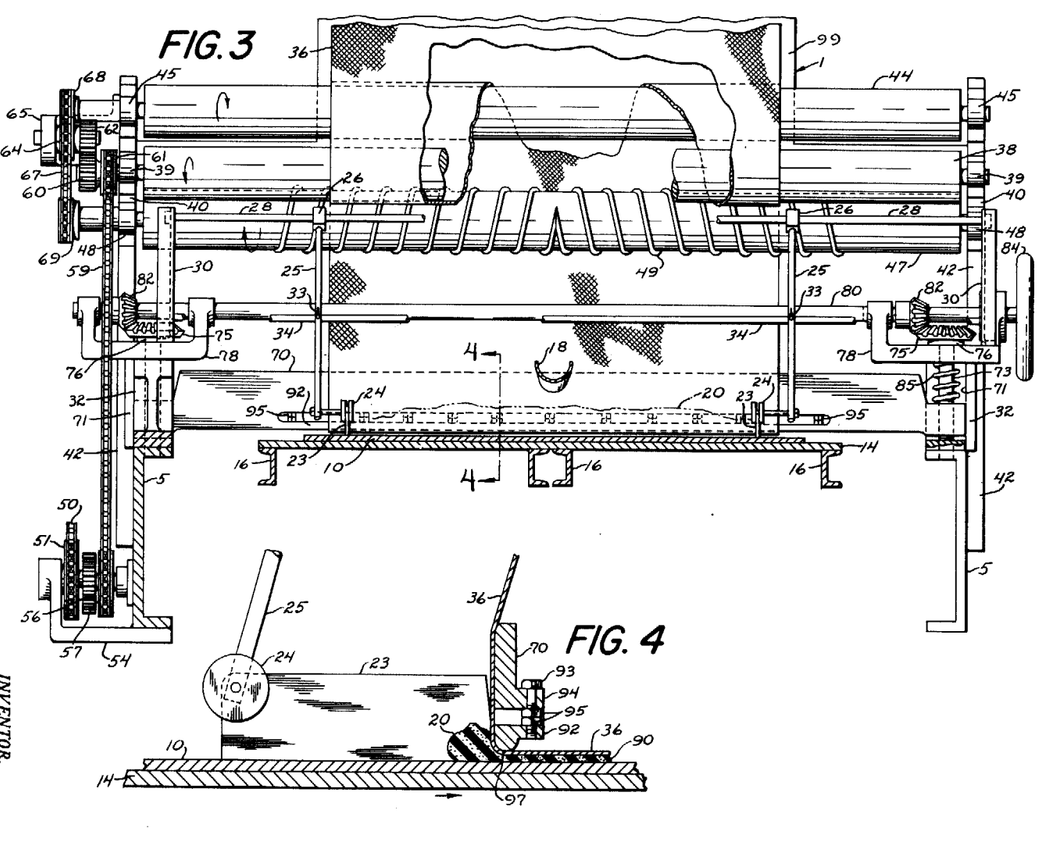
Fig. 3 is a side view of the parts of the machine shown in Fig. 2, the location of the view being indicated by the line 3—3 of Fig. 2.
Fig. 4 is an enlarged detail of the doctor or gage which determines the depth of the foamed layer. This view also shows the point at which the fabric layer meets the foamed layer and where the composite material enters the setting or gelling chamber.

The mass of foamed latex is confined laterally by two sideboards 23, each of which is held in a clamp 24 carried on the lower end of a swinging adjustable arm 25. The arms 25 are supported at their upper ends in blocks 26, pivotally mounted on a bar 28 which extends across the front of the machine, being mounted in the upper ends of uprights 30 carried on blocks 32 mounted on the top of the channels 5. The blocks 26 are adjustable along the bar 28 and, at a midway point in each arm 25, there is a set screw 33 which rests against a bar 34 extending across the machine. This arrangement enables the sideboards 23 to be adjusted laterally, the lower edges of the sideboards resting upon the upper surface of the belt 10, preventing escape of the foamed latex and controlling the width of the foamed latex layer. The sideboards are set inwardly of the edges of the fabric so that no latex comes in contact with the doctor. If latex is permitted to contact a stationary surface, it will coagulate there and tend to streak the surface of the foamed layer and ruin the product. By having the latex contact the moving fabric only, there is no opportunity for the latex to collect and coagulate at the point where the foamed mass is leveled off.

The fabric 36 is led from the supply roll 3 over the idler roller 37 and thence to a series of feeding and measuring rolls, which insure that the fabric is fed at a speed equal to the speed of the belt 10 and is smoothly and evenly applied. The first roll is indicated at 38 and is rotatably supported on bearings 39 carried on brackets 40, which are secured near the upper ends of upright channels 42 at the side of the machine. From the roll 38 the fabric passes around a second roll 44 mounted in bearings 45 on the upper end of the channel 42. From roll 44, the fabric passes downwardly in contact with a third roll 47 mounted on bearings 48 on the channels 42. This roll 47 is provided with the double spiral rib formation shown at 49 in Fig. 3, which spreads the fabric laterally and prevents the formation of wrinkles.

The several feeding rolls 38, 44, and 47 are driven in unison with each other by means of a chain drive from the shaft of the pulley 11. The sprocket chain 50 from the pulley 11 drives a second sprocket 51 mounted on a short shaft 52 carried by one of the channels 5 and by an outboard bracket 54 secured to the lower side of the channel. This drives a second shaft 55, also mounted on the supports 5 and 54, through the intermeshing gears 56. On shaft 55 is a sprocket 57 which, through chain 59, drives a sprocket 61 on the shaft of the roll 38. Gear 63 on roll 38 and intermeshing gear 62 drive a sprocket 64 mounted in a bracket 65 which is attached to a channel 42. A sprocket chain 67 passes over sprocket 64 and over sprockets 68 and 69 on the rolls 44 and 47 respectively.

From the roll 47 the fabric passes downwardly over the face of the doctor or gage, which forms the restricted throat that determines the depth of the foamed layer on the belt. The doctor applies the fabric to the upper surface of the layer of foamed latex as the layer is formed. While several forms of doctor rolls or doctor blades have been tried out for this purpose, the most efficient is that shown in Figs. 3 and 4. This consists of a long bar or beam 70 which extends across the front of the setting chamber and over the belt 10. The ends of this beam are reduced and received in slideways 71 formed on the inner faces of the blocks 32. Each end of the beam 70 is threaded on a short vertical shaft 73 set at its lower end in the block 32. The upper end of each shaft 73 is provided with a bevel pinion 75. A collar 76 on each shaft rests upon the horizontal arm of a yoke 78 supported on the top of the block 32. Received in the vertical arms of the yoke 78 is a long shaft 80 to which are keyed the bevel pinions 82 meshing with the pinions 75. A hand wheel 84 on one end of shaft 80 provides the means for raising and lowering the doctor so as to vary the depth of the foamed layer. Coiled springs 85 surround the shafts 73 and bear against the yokes and the ends of the beam, so as to prevent any play between the beam and the adjusting screws.

It is essential for uniformity of production that the foamed layer, which is indicated by the numeral 90, be of even gauge throughout the width of the composite sheet and, as the machine is adapted to produce composite sheet material of very substantial width, sagging of the doctor in the center should be avoided. For this purpose, the center of the beam 70 is relieved along its lower edges and in the long recess thus provided is set the long doctor bar 92, which is supported by several set screws 93 distributed along the working area by passing through a flange 94 at the rear of the beam and into the body of the doctor bar. Lock nuts 95 fix the doctor bar in its adjusted position.

The fabric 36 passes downwardly over the smooth vertical face of the beam 70 and thence over a rounded nose 97 on the forward working edge of the doctor bar 92, which lays the fabric on top of the foamed layer 90. The movement of the belt draws the fabric over the feed rolls, which may be driven at a greater surface speed than the speed of the belt. The movement of the belt and fabric draws the foam so that it forms a sandwich layer between the fabric and the belt, the thickness of which is determined by the vertical adjustment of the doctor. A large bank 20 of foamed latex is always maintained at the face of the doctor.

Foamed latex contains a substantial percentage of free water and is moist and tacky to the touch. The moment the fabric is brought into contact with the bank of latex, the water will be absorbed by and penetrate into the fabric, and the latex will adhere to it. This will carry some of the latex into the interstices of the fabric, which will securely anchor the resultant sponge rubber onto the fabric. In most fabrics, the latex will not penetrate to the opposite side of the fabric but will merely anchor itself therein. When the material is cured, there will be a vulcanized bond between the sponge rubber layer and the fabric backing.

As the composite layer passes from beneath the doctor, it is ready for the setting or gelling operation. During the setting period the composite sheet of fabric and foamed latex should not be disturbed because, before the foam is set, it is very delicate and any disturbance of the fabric will cause the foam to collapse before it is set. The time, temperature, and humidity factors are controlled in such a manner that when the composite material reaches the delivery point at the far end of the chamber 1, the foam is thoroughly set.

While the design of the setting chamber may be varied, the one shown herein has been found to operate satisfactorily and to deliver the material in firmly set condition, so that the foamed layer will not collapse during the subsequent vulcanizing treatment.

The setting chamber shown herein as a long, box-like structure which surrounds the setting belt and closes in the space above the belt except at the points of ingress and egress.

The details of construction are unimportant and no detailed description is necessary. It will be noted, however, that the roof 98 of the setting chamber is open at the region near the end walls 99 and 100 to provide passages which connect with a long, central, overhead duct 101 to provide for the constant circulation of air through the chamber. At one end of the chamber, shown as the delivery end, there is located a heating and air circulation unit which is suspended from the ceiling 98 and consists of heaters 104 and fans 105, driven by the motor 106 at the side of the chamber 1. Additional heaters and fans may be located at other parts of the setting chamber if found necessary.

One of the features of the product is its smooth or planished finish. This is because the foamed layer sets up in contact with the smooth, polished surface of the belt and retains the texture imparted to it by the surface of the belt. To insure that the top surface of the belt 10 will have a clean surface at all times, a cleaning roll 108 is provided, extending across the belt.

Figure 5:
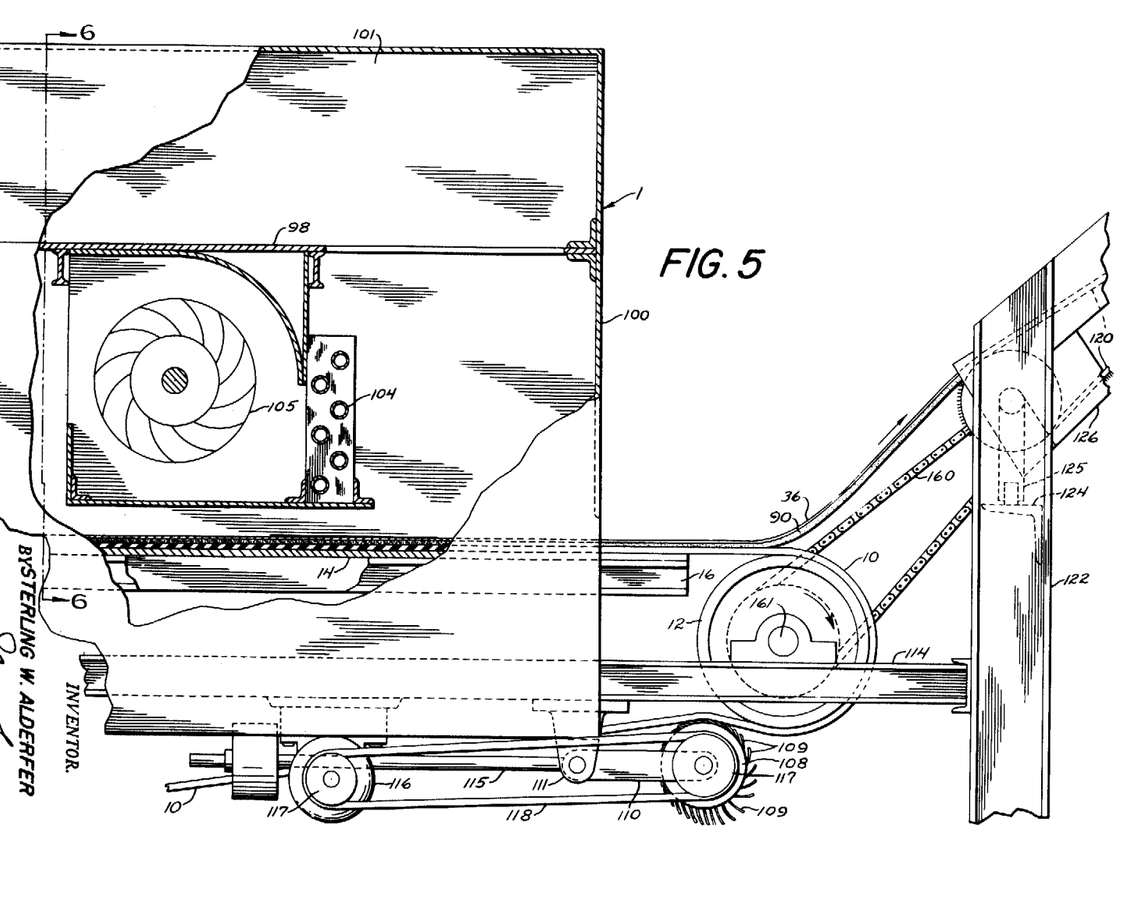
Fig. 5 is a view at the delivery or right hand end of the setting chamber. This view also shows the point at which the composite material goes to the tentering apparatus, on which it is held during the vulcanizing operation.
Figure 6:
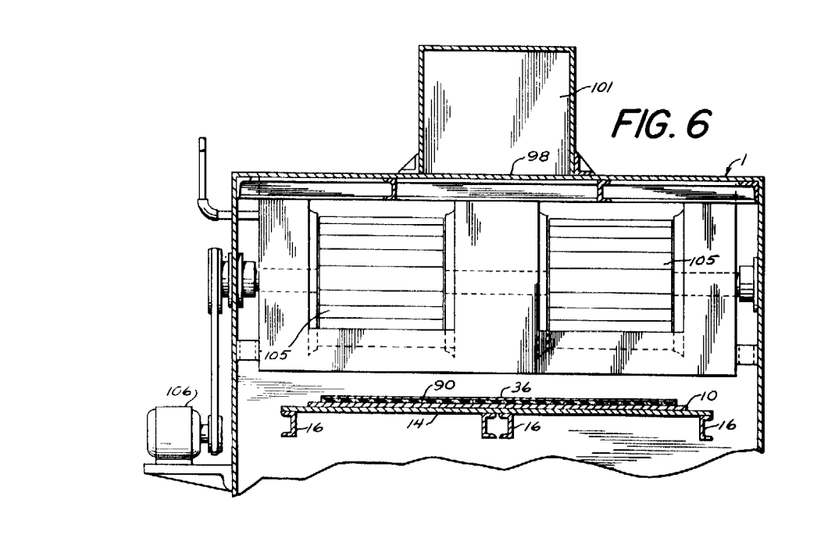
Fig. 6 is a section on the line 6—6 of Fig. 5.

This roll 108 may have any type of surface, the showing in Fig. 5 being of a type in which a multiplicity of cloth wipers 109 are attached to the body of the roll. The roll is mounted in a swinging frame 110 pivoted in brackets 111 carried on the beams 114 at the base of the setting chamber. A counterweighted arm 115 forces the polishing roll against the surface of the belt. The roll 108 is driven in the direction opposite the travel of the belt by a motor 116 connected to the roll by pulleys 117 and belt drive 118.

In actual operation, it has been found that with a setting chamber approximately 45 to 50 feet in length, with a temperature maintained at approximately 150° F., and with the material progressing at about 3 feet per minute, the foam will set up properly. These figures may be varied with the compounding of the stock and other factors within the control of the compounder.

The foamed layer being firm enough for the subsequent handling, the composite material now passes to any suitable or standard form of tentering apparatus on which it is finally cured. In the case of some types of fabric backings, it is necessary not only to hold the material by the edges of the fabric layer during curing, but also to impart a certain amount of stretch thereto. These factors are determined by the nature of the fabric layer and are controlled by the adjustment of the tentering belts.

Figures 7, 10, 11:
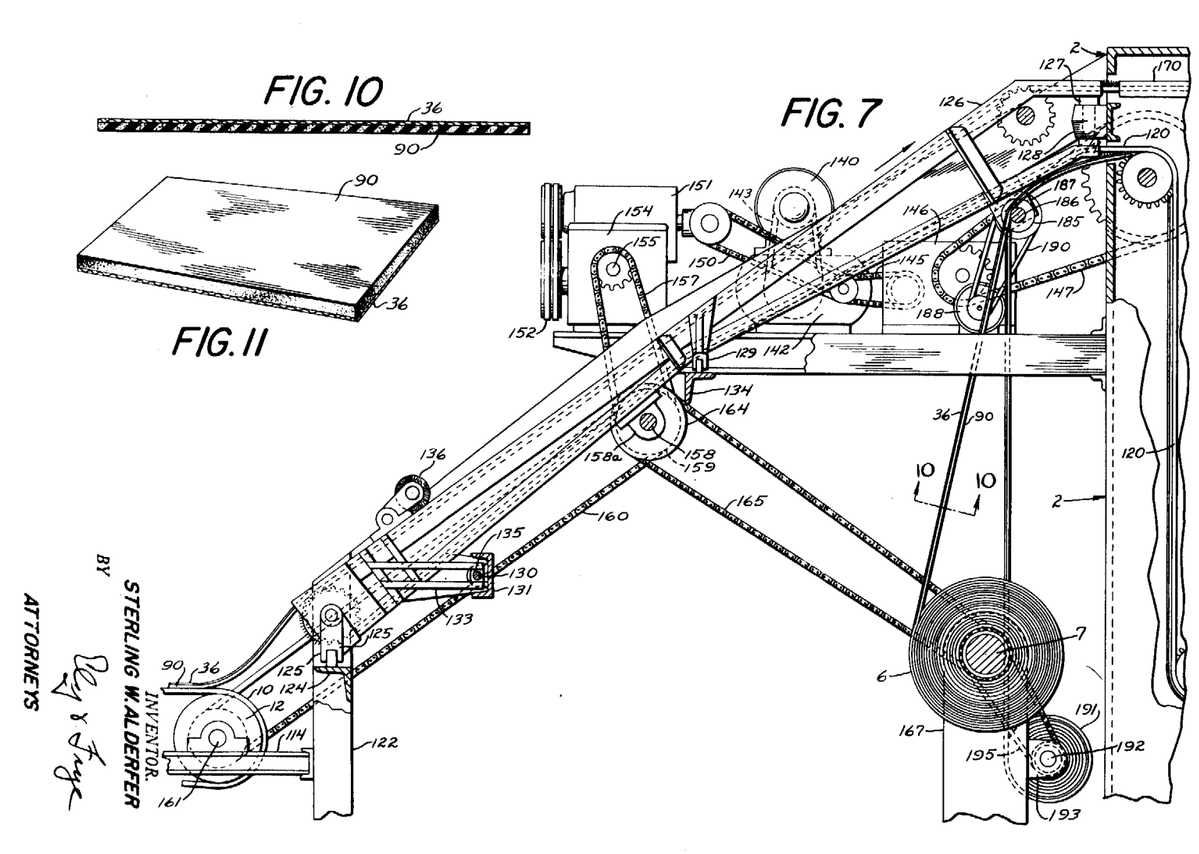
Fig. 7 is a side view showing the details of the receiving end of the tentering apparatus and the delivery of the completed vulcanized material. The location of this view is indicated by the section line 7—7 of Fig. 8.
Fig. 10 is a section through the finished product on the line 10—10 of Fig. 7.
Fig. 11 is a perspective view of a section of the finished product.
Figure 8:
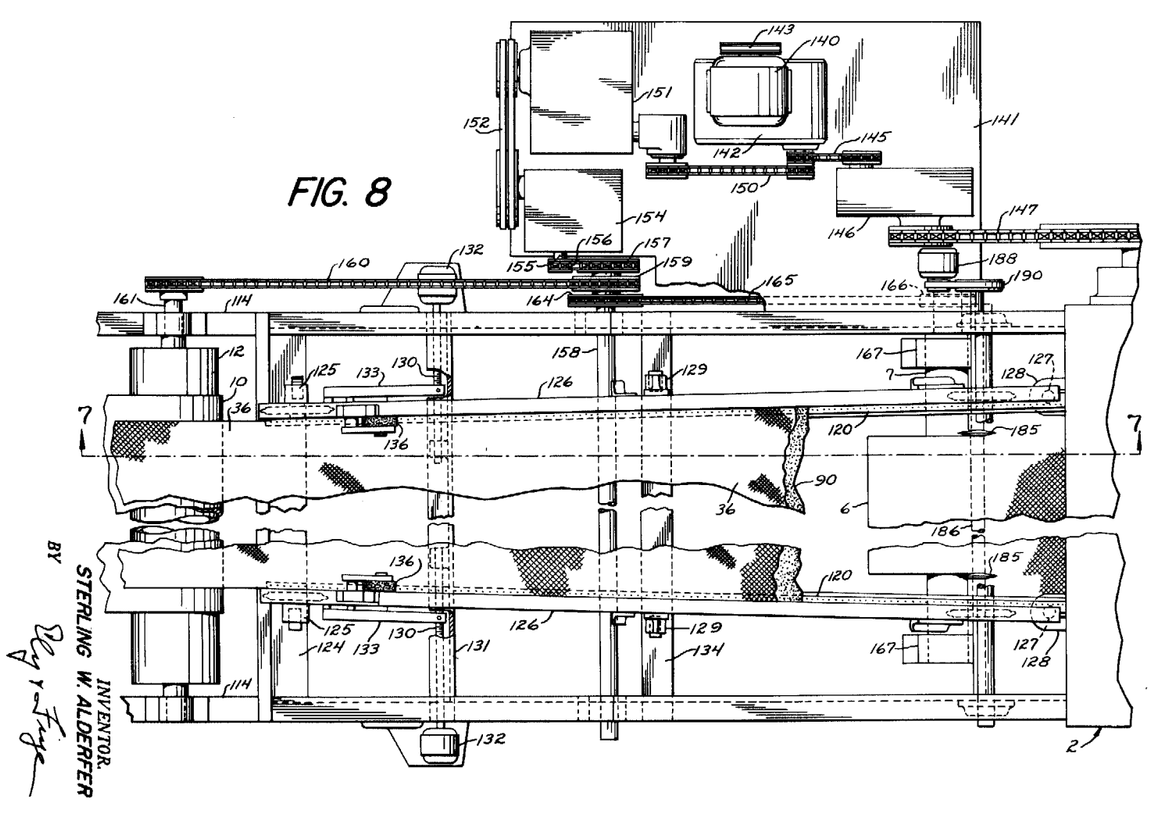
Fig. 8 is a plan view of the parts shown in Fig. 7.

The composite layer is lifted from the belt 10 by attaching the edges of the fabric to pins projecting from the two belts or chains 120 of the tentering mechanism. This tentering machine is described only in such detail as may be necessary for a clear understanding of the remainder of the apparatus. The receiving end of the tentering mechanism is supported on a frame, indicated at 122, which is attached to the ends of the beams 114. Across the frame is a supporting rail or track 124, on which are mounted the wheeled carriages 125 which carry the pulleys over which the belts 120 travel. To these carriages are attached the long channels 126 or side supports constituting the tentering frame, the upper ends of which are pivotally mounted at 127 to adjustable brackets 128 on the front wall of the vulcanizing chamber 2. Secondary carriages 129, riding on the rail 134, support the tentering mechanism at its midway point.

The receiving ends of the belts are adjustable toward and from one another by threaded shafts 130 mounted in a channel 131 across the tentering frame. Small motors 132 drive the shafts and the carriages 125 are connected to the shafts 130 by brackets 133, the ends of which carry nuts 135 engaging the shafts. By the adjustment of the pivot points 127 and the carriages, any degree of stretch can be imparted to the material after the edges of the fabric are attached to the tentering belts. Small brushes 136 bear against the edges of the fabric and press it down upon the pins, as is well known in the art of textile manufacture.

The tentering belts and other parts of the apparatus, including the belt 10, are driven from a large motor 140 and drive mechanism carried on an elevated platform 141 at the side of the tentering frame. The motor is mounted upon a housing 142, containing a variable speed drive transmission, driven by belt 143 from the motor. From the output shaft of the unit 142, a second belt 145 drives the speed reduction unit 146 which, through the chain drive 147 and through appropriate sprocket and chain connections, indicated at 148 in Fig. 9, propels the tentering belts through the several festoons in the vulcanizing chamber 2.

From the output shaft of the unit 142 and through the belt 150, is driven a second variable speed unit 151 which, through the belt 152, drives a gear reduction unit 154. On the output shaft 155 of unit 154 is a sprocket 156 which, through chain 157, drives a countershaft 158 mounted in brackets 158a on the underside of the tentering frame. On the shaft 158 is a sprocket 159 which, through the chain 160, drives the shaft 161 of the pulley 12. Through the belt 10 and pulley 11, the fabric feed mechanism at the intake end of the setting chamber is driven by the mechanism described in connection with Figure 2 of the drawings.

A second sprocket 164 on shaft 158 drives a chain 165 which travels over a sprocket 166 on the end of the wind-up beam 7 mounted in the stand 167. The sprocket 166 is connected directly to any well known type of slip clutch (not shown) so as to compensate for the increase in the size of the wind-up roll 6.

Figure 9:
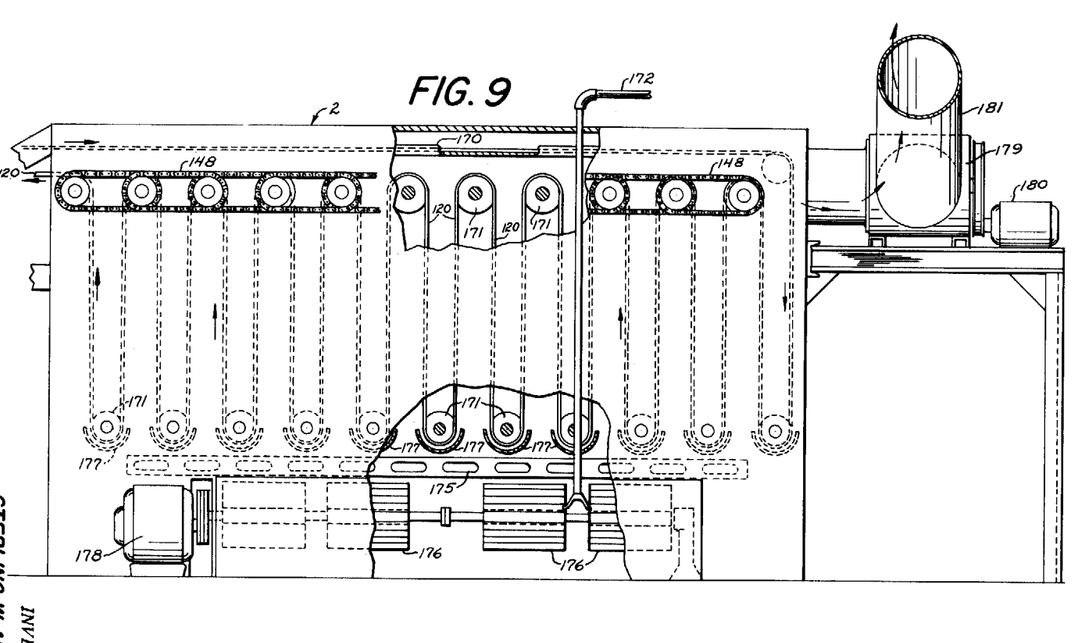
Fig. 9 is a side elevation and partial section of the vulcanizing chamber.

The tentering belts, with the composite material attached thereto and held under the requisite degree of tension, pass into the upper part of the vulcanizing chamber 2, where they are received and guided in long channels 170 which conduct the material to the rear of the chamber, whence the belts pass in long festoons over the series of upper and lower pulleys 171, which are driven by the chains 148.

The conditions within the chamber 2 are maintained at optimum temperature and humidity to secure the finished cure at the time the material leaves the chamber. Much moisture is supplied by the latex itself, but it is desirable to maintain a relatively high humidity in the vulcanizing chamber at all times. For this purpose, one or more water or steam supplies 172 may be used, delivering sprays to the interior of the chamber. The proper temperature, which will depend on the character and compounding of the foamed latex, is supplied by the heaters 175 located in the lower part of the chamber. Large fans 176, distributed across the bottom of the chamber and driven by motor 178, supply air, which is heated by the heaters 175 to the correct temperature. Shields 177 protect the material from the direct heat. A large exhaust fan 179, driven by motor 180, withdraws the air from the top of the chamber to the exhaust duct 181. Due to the fact that the composite material is porous throughout, the hot air will not only contact the surfaces of the product but will penetrate through the product, and a better and more uniform vulcanization will result.

In specific operations which have been carried on successfully, a temperature of 215° F. has been found to operate satisfactorily. In the installation illustrated, the capacity of the chamber is approximately 65 yards. These figures may be varied widely in various production operations.

As the vulcanized material passes out of the chamber 2, it is stripped from the belts 120 and passes over two rotating disk-like trimming knives 185, which are adjustably mounted on a shaft 186 mounted in brackets 187 extending from the tentering frame. These cutting disks are set so that they trim off the exposed edges of the fabric and enough of the foamed layer to remove any irregularities along the edges thereof. The shaft 186 is driven by a small motor 188 mounted on the platform 141 and connected to the shaft by the belt 190.

The trimmed finished material passes to the wind-up roll 8 and the trim passes to a wind-up roll 191 mounted on a beam 192 carried in brackets 193 on the side of the stand 167. A belt, indicated by the dotted lines 195, may drive the wind-up roll 191 from the beam 7.

The finished product is shown in Figs. 10 and 11.

It is believed that the operation of the apparatus and the method will be clearly understood from the foregoing. The foam is spread evenly on the belt and the fabric is applied thereto at the point at which the layer of foam is leveled off. The sideboards 23 prevent the foam from directly contacting any part of the doctor. Any depth of foam may be used, in many cases the layer being ¼ of an inch or over, depending upon the use to which the product is put. The foam anchors itself in the fabric, sets up against the surface of the belt, and thus acquires the finish to which reference has been made. The foam sets up in the chamber 1, where the temperature and humidity of the air are adjusted for the best results, and, after it is firmly set, the fabric passes on to the tentering belts by which it is held from shrinking, or may be stretched, during the subsequent vulcanizing operation. During the period that the composite layer is passing through the chamber 2, it is vulcanized under the optimum conditions which are readily controlled and adjusted so that the foam is converted to a uniform layer of sponge rubber. The finished product is trimmed and delivered in roll form, from which useful articles may be made.

Lifting the composite layer of gelled latex and fabric from the belt on which the latex is gelled and holding the fabric taut or positively stretching the fabric during the subsequent curing operation, is an important factor in the production of the finished material. This is because the product should be free of wrinkles and, by the provision of the tentering belt, the finished product comes out of the vulcanization chamber with a smooth surface, free of wrinkles or waviness.

The apparatus and process shown herein are, so far as known, the first to produce perfect composite products of thin rubber sponge and fabric, without any blemishes in the product such as found in sponge rubber sheets which are gelled while the surface thereof is exposed to the atmosphere and with little or no waste due to imperfections in the product. It is also the first machine to produce a thin layer of sponge rubber which is attached to a fabric backing by a vulcanized bond in contrast to the usual adhesive bond.

The production of composite fabric and sponge rubber by the method described herein not only gives a product which is much superior to the product of earlier methods, but the production costs are relatively inexpensive and there is relatively small loss due to failure of the process or the machine.

What is claimed is:

1. The process of manufacturing a composite sheet of fabric and sponge rubber having a smooth, planished surface free of "pock marks" comprising the steps of supplying a mass of foamed latex containing a gelling agent and vulcanizing ingredients to a smooth surface, leveling off said mass to form a uniform layer of said latex and, while said layer is moist and before it has gelled, applying a fabric layer to the upper surface thereof, gelling the latex while in contact with the said smooth surface, and then vulcanizing the foamed layer by forcing heated air into contact with and through the foamed layer.

2. The process of manufacturing a composite sheet of fabric and sponge rubber comprising the steps of pouring a mass of foamed latex containing a gelling agent and vulcanizing ingredients on a polished surface, leveling off said mass to form a layer of uniform thickness and at the same time applying a fabric to the upper surface of the layer, subjecting the composite layer while on the surface to a gelling atmosphere and, after the latex has gelled in contact with the polished surface, removing the composite sheet from the surface and subjecting it to a heated atmosphere for a sufficient time to vulcanize the foamed and gelled latex.

3. The process of manufacturing a composite sheet containing sponge rubber comprising the steps of making a layer of uniform thickness from a foamed latex containing a gelling agent and, while the surface of the latex is wet and tacky, applying a porous backing sheet thereto, gelling the foamed latex while in contact with the backing sheet and then vulcanizing the foamed latex by passing hot air into contact with the surfaces of the sheet and through the foamed layer while both surfaces of the composite sheet are exposed to the air.

4. The process of manufacturing a composite sheet of fabric and sponge rubber comprising the steps of depositing a mass of foamed latex containing a gelling agent between a moving surface and one side of a moving fabric, and causing the fabric and the surface to pass through a restricted throat before the latex has gelled, gelling the foam while held between the fabric and the surface, and vulcanizing the foamed layer while in contact with the fabric.

5. The process of manufacturing a composite sheet of fabric and sponge rubber comprising the steps of pouring onto a smooth surface a mass of foamed latex containing a gelling agent, leveling off the mass of latex between the surface and the fabric to form a layer of even thickness having one side in contact with said surface and the other side adhering to the fabric, gelling the latex while in contact with the surface, separating the fabric with the gelled latex foam adhering thereto from the surface, and then vulcanizing the foamed latex.

6. The process of manufacturing a composite sheet of textile fabric and sponge rubber comprising the steps of pouring onto a smooth surface a mass of foamed latex containing a gelling agent, leveling off the mass of latex to form a layer of even thickness on the said surface and at the same time applying the fabric to the top of the layer, gelling the latex while in contact with the surface, removing the composite material from the surface, and then vulcanizing the foamed latex.

7. The process of manufacturing a composite sheet of fabric and sponge rubber comprising the steps of pouring a mass of foamed latex containing a gelling agent upon a moving surface, leveling off the mass of latex to form a layer of even thickness by passing the latex before it has gelled between the said surface and the fabric, while the latter is held at a fixed distance from the surface, gelling the latex while in contact with the moving surface and while adhered to the fabric, and vulcanizing the foamed layer.

8. The process of manufacturing a composite sheet of fabric and sponge rubber comprising the steps of pouring a mass of foamed latex containing a gelling agent upon a smooth moving surface, leveling off the mass of latex to form a layer of even thickness and, at the same time, applying a fabric to the upper side of the layer before the latex has gelled, gelling the latex while in contact with the moving surface, removing the composite sheet from said surface, and vulcanizing the foamed layer.

9. The process of manufacturing a composite sheet containing sponge rubber and fabric, comprising the steps of making a mass of foamed latex containing a gelling agent, before the latex has gelled and in a single operation leveling off the mass and laying a backing sheet on the top of the said layer, gelling the foamed latex while in contact with the sheet, and vulcanizing the foamed layer.

10. The process of manufacturing a composite sheet containing sponge rubber and fabric, comprising the steps of covering a smooth surface with a mass of foamed latex containing a gelling agent, before the latex has gelled and in a single operation leveling off the mass and applying a fabric layer to the foamed latex, gelling the latex while in contact with the said surface and fabric, removing the composite sheet from the surface, and vulcanizing the foamed layer.

11. The process of manufacturing a composite sheet containing sponge rubber and fabric, comprising the steps of covering a smooth surface with a mass of foamed latex containing a gelling agent, before the latex has gelled and in a single operation leveling off the mass and applying a fabric layer to the foamed latex, gelling the latex while in contact with the said surface and fabric, removing the composite sheet from the surface, and vulcanizing the foamed layer by passing heated air in contact with and through the foamed layer.

12. Apparatus for the manufacture of fabric backed sponge rubber products from foamed latex containing a setting agent, comprising a setting chamber and a vulcanizing chamber, a traveling belt moving through the setting chamber, means to form a layer of foamed latex of even thickness on the belt prior to its entrance into the setting chamber, means to apply fabric to the upper surface of said layer before the layer has set, and a conveyor to receive the fabric at the discharge end of the belt, said conveyor passing through the vulcanizing chamber.

13. Apparatus for the manufacture of fabric backed sponge rubber products from foamed latex containing a setting agent, comprising a setting chamber and a vulcanizing chamber, a traveling belt having a smooth upper surface moving through the setting chamber, a doctor located over the belt prior to its entrance into the setting chamber to form a layer of foamed latex of even thickness on the belt, means to pass the fabric between the doctor and the foamed latex and apply the fabric to the surface of said layer while the foamed latex is passing the doctor, and a conveyor to receive and hold the fabric as the composite product issues from the setting chamber, said conveyor passing through the vulcanizing chamber.

14. Apparatus for the manufacture of fabric backed sponge rubber products from foamed latex containing a setting agent, comprising a setting chamber and a vulcanizing chamber, a traveling belt moving through the setting chamber and adapted to support a layer of foamed latex, means for applying the fabric to the top of said layer before the foamed latex is set, and means to seize the edges of the fabric and lift the fabric and the latex from the belt after the latex has set and to lead the composite material thus formed through the vulcanizing chamber.

15. Apparatus for the manufacture of fabric backed sponge rubber products from foamed latex containing a setting agent, comprising a setting chamber and a vulcanizing chamber, a traveling belt moving through the setting chamber and adapted to support a layer of foamed latex, a doctor over the belt at the entrance to the setting chamber to level off the foamed latex, means to apply a fabric to the latex at the doctor, and a conveyor adapted to receive the composite layer of fabric and foamed latex as it issues from the setting chamber, and means to guide the said conveyor through the vulcanizing chamber.

16. Apparatus for the manufacture of a fabric backed sponge rubber product from foamed latex containing a setting agent, comprising a setting chamber and a vulcanizing chamber, a traveling belt moving through the setting chamber and adapted to support a layer of foamed latex, a doctor over the belt at the entrance to the setting chamber to level off the foamed latex, means to apply a fabric to the upper surface of the foamed latex after it has been leveled off and before the latex has set, and a conveyor to receive the product from the setting chamber and carry it through the vulcanizing chamber.

17. Apparatus for the manufacture of a fabric backed sponge rubber product from foamed latex containing a setting agent, comprising a setting chamber and a vulcanizing chamber, a traveling belt moving through the setting chamber and adapted to support a layer of foamed latex, a doctor over the belt at the entrance to the setting chamber to level off the foamed latex, means to feed fabric over the face of the doctor and onto the layer of latex formed thereby, and a conveyor to receive and hold the product as it issues from the setting chamber and means to guide said conveyor through the vulcanizing chamber.

18. Apparatus for the manufacture of fabric backed sponge rubber products from foamed latex containing a setting agent, comprising a setting chamber and a vulcanizing chamber, an endless belt passing through the setting chamber, a doctor above the surface of the belt adjacent the point where the belt enters the setting chamber, means for feeding a backing layer over the face of the doctor and onto the foamed latex at the same speed as the belt, tentering belts at the discharge end of the setting chamber, means on the tentering belts to receive and hold the edges of the backing layer, and means to guide the tentering belts through the vulcanizing chamber.

19. Apparatus for the manufacture of fabric backed sponge rubber products from foamed latex containing a setting agent, comprising a setting chamber and a vulcanizing chamber, an endless belt passing through the setting chamber, a doctor above the surface of the belt adjacent the point where the belt enters the setting chamber, means for feeding a backing layer and applying it to the upper surface of a layer of foamed latex as it is leveled off by the doctor, tentering belts at the discharge end of the setting chamber, means on the tentering belts to receive and hold the edges of the backing layer, and means to guide the tentering belts through the vulcanizing chamber.

20. In an apparatus for the manufacture of a composite product of sponge rubber-like material and a backing sheet attached to one side of the sponge rubber, an endless belt having a smooth surface, means for forming a layer of foamed latex of even thickness on the surface of the belt, means for applying the backing sheet to the top of said layer as it is formed and before it has set, a setting chamber through which said belt passes, conveying means to receive the composite product as it leaves the setting chamber and strip it from the belt to expose the surface of the sponge rubber which has set against the smooth surface of the belt, and a vulcanizing chamber through which the said conveying means passes.

21. In an apparatus for the manufacture of a composite product of sponge rubber-like material and a backing sheet attached to one side of the sponge rubber an endless belt having a smooth surface, means for forming a layer of foamed latex of even thickness on the surface of the belt, means operating in timed relation to the speed of the belt for applying the backing sheet to the top of said layer as it is formed and before it has set, a setting chamber through which said belt passes, a conveyor having means to seize and hold the edges of the backing sheet as the product leaves the setting chamber and to strip it from the belt to expose the surface of the sponge rubber which has set against the smooth surface of the belt, and a vulcanizing chamber through which the said conveyor passes.

22. In an apparatus for the manufacture of a composite sheet of sponge rubber-like material and a backing layer attached to one side of the sponge rubber, an endless belt, means for pouring a mass of foamed latex on one end of the belt, a doctor to level off the foamed latex, means for passing the backing layer around the doctor and onto the upper side of the leveled off foamed latex before it has set, a setting chamber through which the belt passes, and means to receive the composite sheet from the setting chamber and to vulcanize the foamed latex.

23. In an apparatus for the manufacture of a composite sheet of sponge rubber-like material and a backing layer attached to one side of the sponge rubber, an endless belt, a doctor to level off a mass of foamed latex on the belt, means for applying the backing layer to the upper surface of the leveled off mass at the doctor, and a setting chamber through which the belt passes after leaving the doctor.

24. In an apparatus for the manufacture of a composite sheet of sponge rubber-like material and a backing layer attached to one side of the sponge rubber, an endless belt, a doctor to level off a mass of foamed latex on the belt, means to conduct the backing layer over the surface of the doctor and onto the upper surface of the foamed latex, and a setting chamber through which the belt passes after leaving the doctor.

25. The process of manufacturing a composite sheet of sponge rubber and fabric comprising the steps of forming on a surface a layer of foamed latex containing a gelling agent and a vulcanizing ingredient, applying the fabric to the upper surface of said layer before the layer has set, gelling the layer of foamed latex while in contact with the fabric and the surface, lifting the composite fabric and gelled latex from the surface to expose the side of the sponge rubber which has gelled against the surface, stretching the fabric and, while the fabric is under tension, vulcanizing the foamed latex.

26. The process of manufacturing a composite sheet of sponge rubber and fabric comprising the steps of forming on a surface a layer of foamed latex containing a gelling agent and a vulcanizing ingredient, applying the fabric to the upper surface of said layer before the layer has set, gelling the layer of foamed latex while in contact with the fabric and the surface, lifting the composite fabric and gelled latex from the surface to expose the side of the sponge rubber which has gelled against the surface, holding the fabric in a taut condition and while the fabric is so held vulcanizing the foamed latex.

27. Apparatus for manufacturing a composite sheet of sponge rubber and fabric comprising a traveling belt, means for forming on the belt a layer of foamed latex containing a gelling agent and a vulcanizing agent, means for applying fabric to the upper surface of the layer, means for setting the layer while the fabric is in contact therewith, a traveling conveyor to lift the composite layer of gelled latex and fabric from the belt to expose the side of the sponge rubber which has set against the belt, means associated with the conveyer to stretch the fabric, and a vulcanizing chamber through which the conveyer passes while the fabric is in stretched condition.

28. Apparatus for manufacturing a composite sheet of sponge rubber and fabric comprising a traveling belt, means for forming on the belt a layer of foamed latex containing a gelling agent and a vulcanizing agent, means for applying fabric to the upper surface of the layer, means for setting the layer while the fabric is in contact therewith, a traveling conveyer to lift the composite layer of gelled latex and fabric from the belt to expose the side of the sponge rubber which has set against the belt, means associated with the conveyer to hold the fabric in a taut condition, and a vulcanizing chamber through which the conveyer passes while the fabric is in taut condition.

29. The process of manufacturing a composite porous sheet containing sponge rubber and fabric comprising the steps of uniting a fabric with a layer of foamed latex containing a gelling agent, gelling the latex, holding the composite sheet in a taut condition, and forcing heated air through the composite sheet to vulcanize the latex.

30. The process of manufacturing a composite porous sheet containing sponge rubber and fabric comprising the steps of uniting a fabric with a layer of foamed latex containing a gelling agent, gelling the latex, holding the composite sheet under tension, and forcing heated air through the composite sheet to vulcanize the latex.

31. The process of manufacturing a composite porous sheet containing sponge rubber and fabric comprising the steps of uniting a fabric with a layer of foamed latex containing a gelling agent, gelling the latex and then forcing heated air through the interstices of the fabric and the gelled latex at the temperature and for a period to vulcanize the latex.

32. The process of manufacturing a composite porous sheet containing sponge rubber and fabric comprising the steps of uniting a fabric with a layer of foamed latex containing a gelling agent, gelling the latex, suspending the composite sheet in a heated chamber with both sides of the sheet exposed, and passing heated gas through the composite sheet to vulcanize the gelled latex.

33. The process of manufacturing a composite sheet composed of a layer of sponge rubber and a backing layer to which said sponge rubber layer is secured, the steps of depositing an unformed mass of unvulcanized foamed rubber containing a gelling agent between said backing layer and a second layer of sheet material impervious to the said foamed rubber, bringing said mass of foamed rubber to a uniform thickness while held between said layers, gelling the foamed latex while held between said layers with one surface in contact with the second layer, and separating the second layer from the face of the sponge rubber.

34. The process of manufacturing a composite sheet composed of a layer of sponge rubber and a backing layer to which said sponge rubber layer is secured, the steps of depositing an unformed mass of unvulcanized foamed rubber containing a gelling agent between said backing layer and a second layer of sheet material impervious to the said foamed rubber while said layers are in motion, bringing said mass of foamed rubber to a uniform thickness while held between said layers by passing the composite sheet through a restricted throat, gelling the foamed latex while held between said layers with one surface in contact with the second layer, and separating the second layer from the face of the sponge rubber.

35. The process of manufacturing a composite sheet composed of a layer of sponge rubber having a smooth, planished outer surface and a backing layer to which said sponge rubber layer is bonded by penetration of the sponge rubber, the steps of depositing an unformed mass of unvulcanized rubber foam containing a gelling agent between said backing layer and a second layer of sheet material impervious to said foamed rubber, bringing said mass of foamed rubber to a uniform thickness while held between said layers, gelling the foamed latex while held between said layers with its outer surface in contact with the second layer, and stripping the second layer from the surface of the sponge rubber.

36. The process of manufacturing a composite sheet composed of a layer of sponge rubber having a smooth, planished upper surface and a backing layer to which said sponge rubber layer is bonded by penetration of the sponge rubber, the steps of depositing an unformed mass of unvulcanized rubber foam containing a gelling agent between said backing layer and a second layer of sheet material impervious to said foamed rubber while said layers are in motion, bringing said mass of foamed rubber to a uniform thickness while held between said layers, gelling the foamed latex while held between said layers with one surface in contact with the second layer, and stripping the second layer from the surface of the sponge rubber.

STERLING W. ALDERFER.

REFERENCES CITED

The following references are of record in the file of this patent:

UNITED STATES PATENTS

| Number | Name | Date |
|---|---|---|
| Re. 22,290 | Teague et al. | Mar. 16, 1943 |
| 1,696,129 | Silver | Dec. 18, 1928 |
| 1,777,945 | Untiedt | Oct. 7, 1930 |
| 2,161,308 | Murphy et al. | June 6, 1939 |
| 2,233,274 | Teague | Feb. 25, 1941 |
| 2,441,235 | Blair et al. | May 11, 1948 |
| 2,445,732 | Carter | July 20, 1948 |